United States Patent
Wu et al.

[19]

[11] Patent Number: 6,052,438
[45] Date of Patent: *Apr. 18, 2000

[54] METHOD AND APPARATUS FOR SENDING AN ANNOUNCEMENT TO CALLER

[75] Inventors: Woody Wu; Qilin Huang, both of Richardson, Tex.

[73] Assignee: Ericsson Inc, Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,049

[22] Filed: Nov. 26, 1996

[51] Int. Cl.$^7$ ....................................................... H04M 1/64
[52] U.S. Cl. .................. 379/67.1; 379/88.04; 379/88.13; 379/88.18; 379/88.22
[58] Field of Search .................................. 379/67, 88, 89, 379/67.1, 72, 76, 77, 88.01, 88.04, 88.13, 88.17, 88.27, 88.22, 88.18

[56] References Cited

U.S. PATENT DOCUMENTS

| | | | |
|---|---|---|---|
| 4,035,589 | 7/1977 | Parke | 179/100.1 |
| 4,277,649 | 7/1981 | Sheinbein | 379/67 |
| 4,893,329 | 1/1990 | O'Brien | 379/88 |
| 4,958,366 | 9/1990 | Hashimoto | 379/74 |
| 5,027,384 | 6/1991 | Morganstein | 379/67 |
| 5,276,731 | 1/1994 | Arbel et al. | 379/88 |
| 5,327,486 | 7/1994 | Wolff et al. | 379/93.23 |
| 5,384,831 | 1/1995 | Creswell et al. | 379/67 |
| 5,434,908 | 7/1995 | Klein | 379/88 |
| 5,557,658 | 9/1996 | Gregorek et al. | 379/67 |
| 5,583,920 | 12/1996 | Wheeler, Jr. | 379/88 |
| 5,604,791 | 2/1997 | Lee | 379/67 |
| 5,742,905 | 4/1998 | Pepe et al. | 455/461 |

*Primary Examiner*—Fan S. Tsang
*Assistant Examiner*—Allan Hoosain
*Attorney, Agent, or Firm*—Jenkens & Gilchrist

[57] ABSTRACT

An apparatus in a local switch or in an advanced intelligent network determines whether a called party is a subscriber of a Send Announcement to Caller subscriber feature whenever a called party receives a call. The apparatus also determines whether the feature is presently activated. If it is, either a selected standard announcement or a customized announcement is played to the calling party. The customized announcement which must be prerecorded, allows a subscriber to give a calling party specific guidelines about whether the calling party should hang up or even bother to call back. In a business environment, this announcement can be used to play a trademark slogan or an advertisement. The call routing process is suspended for a specified amount of time to give the calling party enough time to respond. After specified amount of time has expired, the call routing process is completed.

31 Claims, 3 Drawing Sheets

METHOD AND APPARATUS FOR SENDING AN ANNOUNCEMENT TO CALLER

BACKGROUND OF THE INVENTION

1. Technical Field of the Invention

This invention relates generally to the telecommunications field, and more specifically, to a method and apparatus for use in a telecommunications network for playing an announcement to a calling party.

2. Description of Related Art

Traditionally, the home telephone has facilitated communications between friends and family. However, many calls received during the evening are from organizations seeking to sell products or collect donations. Because these calls are solicitous and usually unwelcome, there is a great demand for subscriber features which enable telephone customers to curtail the ability of outside organizations to invade their privacy at home. Exemplary and commonly known subscriber features which have been developed to help the consumer include Caller ID, Anonymous Call Rejection, Specified Call Blocking and Do Not Disturb. In general, these features either provide information to the called party about an incoming call or operate to reject a call for a specified reason.

There are countless reasons why a person might want to stop or at least reduce the number of calls received at a certain time. For instance, some people dislike answering calls from telemarketing organizations and organizations that seek charitable contributions. Other people prefer to minimize the number of calls received during a certain time. For example, a person may want to limit unnecessary calls during supper, during a television show or sporting event, or while taking a nap. In each of these situations, there is a desire to reduce the number of calls received at a certain time. Moreover, a person may not want to activate a subscriber feature such as Do Not Disturb because it would block all calls, and other subscriber features such as select call blocking may not be available. Accordingly, there is a need for a subscriber feature which helps the subscriber satisfy the goal of reducing the number of calls received during a specified time.

SUMMARY OF THE INVENTION

A method and apparatus are provided for playing a specified announcement to a calling party before call routing is completed. The calling party is given enough time to respond in an appropriate manner (e.g., hang up) if prompted to do so by the announcement, before the routing is completed and before the called party phone begins to ring. More specifically, the call routing process is temporarily suspended while the specified announcement is being played to the calling party. The call routing process is suspended for a specified amount of time after the announcement has been completed, so that the calling party has time to hang up if that is the appropriate response. The announcement which is played to the calling party can either be generated by a local switch or a customized message which has been recorded by the called party at an earlier time. The announcement may be played whenever a call is received or whenever a call is received during a certain time frame.

BRIEF DESCRIPTION OF THE DRAWINGS

A better understanding of the method and apparatus of the present invention may be obtained by reference to the following Detailed Description along with the accompanying Drawings wherein.

DETAILED DESCRIPTION OF THE DRAWINGS

Figure 1:
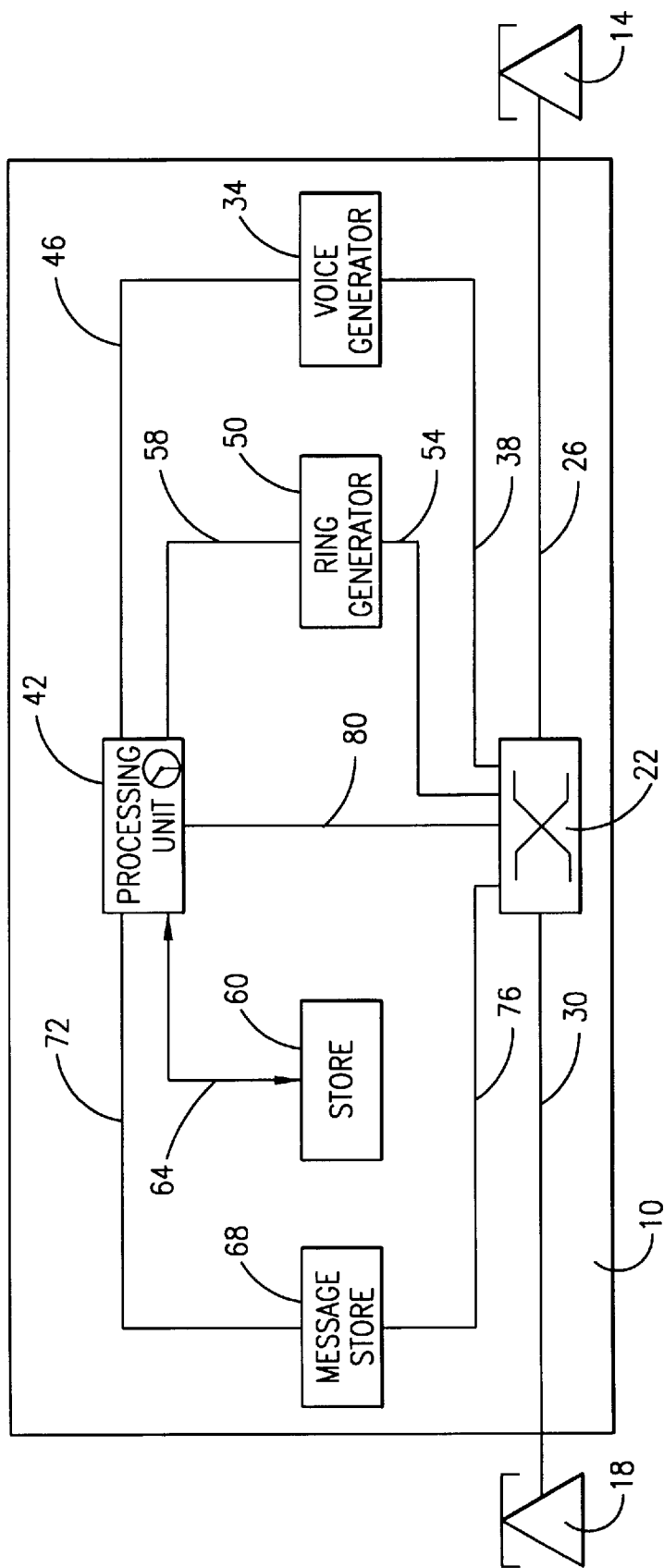
FIG. 1 is a functional block diagram that illustrates one embodiment wherein the present invention is implemented within a local switch.

FIG. 1 is a functional block diagram that illustrates one embodiment wherein the present invention is implemented within a local switch. Referring to FIG. 1, a local switch 10 for connecting a calling party phone 14 to a called party phone 18 is shown. Local switch 10 includes a router 22 which is connected to calling party phone 14 by line 26 and to called party phone 18 by line 30. Generally, router 22 is for connecting one phone line to another and for connecting feature devices within switch 10 to the phone lines carrying a particular call. Feature devices are those devices which are used by a telecommunication network to support subscriber features such as caller ID, call blocking, etc.

One feature device within local switch 10 is a voice generator 34 for generating messages to be played either to a called party or to a calling party. Voice generator 34 is connected to router 22 by line 38 and to processing unit 42 by line 46. Local switch 10 also includes a ring generator 50 which is connected to router 22 by line 54 and to processing unit 42 by line 58. Ring generator 50 causes called party phone 18 to ring whenever a call is being connected from a calling party.

Local switch further includes a store 60 for storing subscriber information. Store 60 is coupled to processing unit 42 by line 64. Typically, store 60 includes a database of all subscribers serviced by local switch 10 and their respective subscriber features. Additionally, if some features are selectably activated, then store 60 further includes information which indicates whether a give subscriber feature is presently activated.

Local switch 10 further includes a message store 68 for recording and playing messages generated by subscribers. Message store 68 is coupled to processing unit 42 by line 72 and to router 22 by line 76. Generally, some subscriber features include the option of recording a message by the subscriber. While message store 68 in FIG. 1 is shown connected to processing unit 42 and to router 22, message store 68 can also be connected to voice generator 34 instead, wherein voice generator 34 writes the stored message to message store 68 and also reads the digitized message therefrom for conversion to an audio or voice message. In yet another embodiment, message store 68 is arranged within voice generator 34. In any case, a message is generated by voice generator 34 if the subscriber has not previously stored a customized message in message store 68.

After a message has been played to the calling party (either by message store 68 or voice generator 34), processing unit 42 delays completing the routing of the call for a specified amount of time after the announcement has been completed. In that way, the calling party has ample time to hang up if that is the appropriate response.

In operation, local switch 10 determines whether the Send Announcement to Caller Subscriber Feature ("SACSF") is activated for the called party at called party phone 18 whenever a call is received. Processing unit 42 in local switch 10 analyzes the contents of store 60 to determine if the SACSF is a subscriber feature of the called party and whether it is presently activated. Generally, store 60 includes a list of all telephones connected to and serviced by local switch 10 and their corresponding subscriber features. In another embodiment, store 60 maintains only a list of SACSF subscribers.

If the called party is a subscriber to the SACSF, local switch 10 then determines if the SACSF is presently activated for the called party. In the preferred embodiment, the SACSF is selectively activated. However, the SACSF can also be continuously activated by the called party. For this embodiment, local switch 10 examines a specified signal stored within store 60 to determine if the SACSF is presently activated. In another embodiment, this signal may be stored within another memory store (not explicitly shown).

In general, there are at least two types of operations which may be implemented for the present invention. In one embodiment, store 60 maintains a list of SACSF subscribers and a signal for each SACSF subscriber which specifies whether the feature is presently activated. In another embodiment, store 60 maintains a list of times during which the feature is to be activated. Accordingly, processor 42 sets the signal which specifies whatever the SACSF feature is presently activated according to the time. For the second embodiment, a specified number may be entered within the list of times during which the feature is to be activated if the called party desired that the SACSF feature be activated continuously. In both embodiments, however, the feature may be activated or deactivated by the subscriber by entry of a designated sequence of numbers/codes on the keypad of the telephone.

If a call is being received for a called party when the SACSF is activated, processing unit 42 of local switch 10 initially suspends the routing of the call. As a part of suspending the call routing, processing unit 42 delays sending control signals to router 22 thereby delaying completion of the call routing. Additionally, processing unit 42 delays sending control signals to ring generator 50 over line 58 to delay the transmission of a ring signal by ring generator 50 over line 54 to router 22. Voice generator 34, plays one of several types of announcements to the calling party. Voice generator 34 has many different announcements which are to be played to a calling party. Generally, voice generator 34 is operable to play any announcement for standard subscriber features. For example, if a Do Not Disturb feature is activated, voice generator 34 informs the calling party that the called party is not accepting calls. Similarly, and with respect to the SACSF, voice generator 34 is operable to play an announcement that prompts the calling party to call back at a later time, unless the call is urgent or important. Alternatively, voice generator 34 can play a message that prompts the calling party to hang up if the call is solicitous in nature.

In yet another embodiment, voice generator 34 includes messages for playing to a calling party to inform the calling party of a certain mode of operation. For instance, if the called party is subject to wiretapping or to having the calls randomly monitored or recorded, voice generator 34 includes a message to so inform the calling party. Consequently, the calling party has the option of hanging up in order to maintain a private phone call.

Generally, voice generator 34 generates standard announcements for use by all subscribers of the SACSF. In the embodiment of FIG. 1, voice generator 34 preferably does not generate customized messages to be played to the calling party.

Message store 68, on the other hand, is preferably operable to generate customized messages. These customized messages are created by the SACSF subscriber at a prior time. Generally, and in accordance with specified steps for recording a private message, local switch 10 prompts the SACSF subscriber to annunciate the message while it is being recorded. More specifically, processing unit 42 causes voice generator 34 to play a standard message to the subscriber to prompt the subscriber to vocalize the message so that it may be recorded. Processing unit 42 also sends control signals to router 22 over line 80 to cause router 22 to connect line 76 and message store 68 to line 30. This action causes message store 68 to be connected to the subscriber's phone line to receive the message that the subscriber wishes to record. Accordingly, the message received from the subscriber is stored in message store 68.

As may be seen therefore, the system of the embodiment of FIG. 1 allows a subscriber to have customized messages for playing to calling parties. Such customized messages may be used by an individual or by a business that is also a subscriber of the SACSF. For example, a business could use the SACSF to play a trademark slogan or advertisement prior to completion of the call connection.

Figure 2:
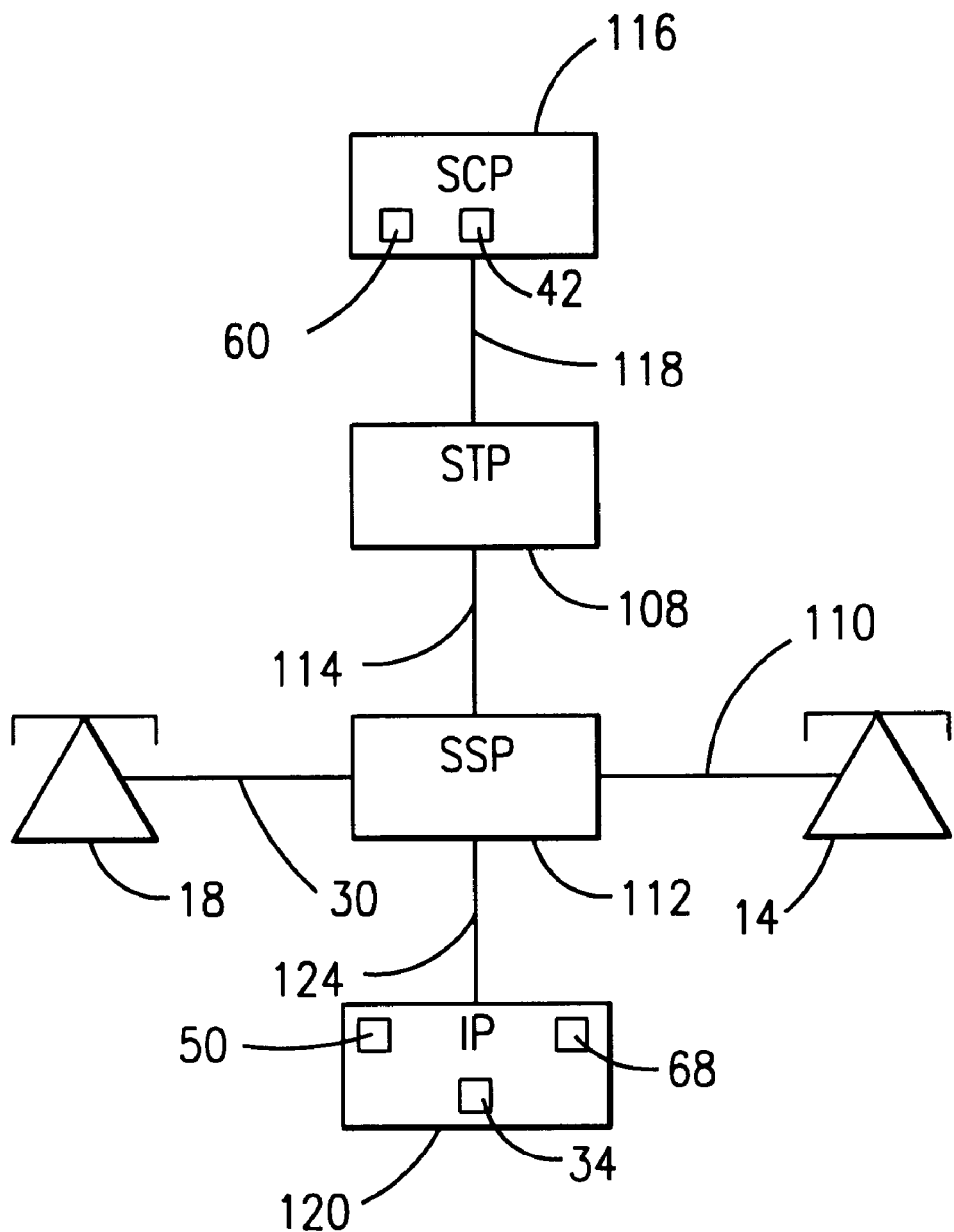
FIG. 2 is a functional block diagram that illustrates a second embodiment wherein the present invention as implemented within an advanced intelligent network.

FIG. 2 is a functional block diagram that illustrates a second embodiment wherein the present invention is implemented within an advanced intelligent network ("AIN"). Referring now to FIG. 2, the system of FIG. 2 is similar to the system of FIG. 1, and includes a ring generator 50, a voice generator 34, a central processing unit 42 and a store 60. However, the AIN also includes a service switching point ("SSP") 112, a signal transfer point ("STP") 108, a service control point ("SCP") 116 and an intelligent peripheral ("IP") 120. The SSP 112, STP 108, SCP 116 and IP 120 are connected in a known AIN configuration. More specifically, as may be seen, calling party phone 14 is connected to SSP 112 by line 110. STP 108 is connected to SSP 112 by line 114. STP 108 is also connected to SCP 116 by line 118. IP 120 is connected to SSP 112 by line 124.

The functionality of the commonly numbered elements within FIGS. 1 and 2 is the same for the embodiments shown in FIGS. 1 and 2. For example, voice generator 34 of FIG. 1 is shown as a system within local switch 10. In the embodiment shown in FIG. 2, however, voice generator 34 preferably resides within IP 120. Nonetheless, the functionality for voice generator 34 is similar for each of the two embodiments. For each embodiment, voice generator 34 is operable to play announcements to calling party at calling party 14.

Operationally, SSP 112 analyzes the called party information for a call being placed by calling party phone 14, and determines whether an AIN treatment is needed and whether the subscriber has AIN capabilities. SSP 112 then sends an inquiry message to STP 108 over line 114. STP 108 then transmits the inquiry message to SCP 116 over line 118. SCP 116 then analyzes the contents of store 60 to determine that called party phone 18 is a subscriber to the SACSF and to determine whether that feature is presently activated. If that feature is activated for called party phone 18, SCP 116 sends a response message to SSP 112 via STP 108, SSP 112 then prompts IP 120 to cause voice generator 34 or message generator 68 to play a specified announcement. The message generated by message store 68 or voice generator 34 is routed to calling party phone 14. As in the system of FIG. 1, a message is generated by voice generator 34 if the subscriber had not previously stored a customized message in message store 68. Similar to the system of FIG. 1, processing unit 42 delays the routing process of the call for a specified amount of time after completion of the announcement to give the calling party ample time to hang up if hanging up is the appropriate response.

Figure 3:
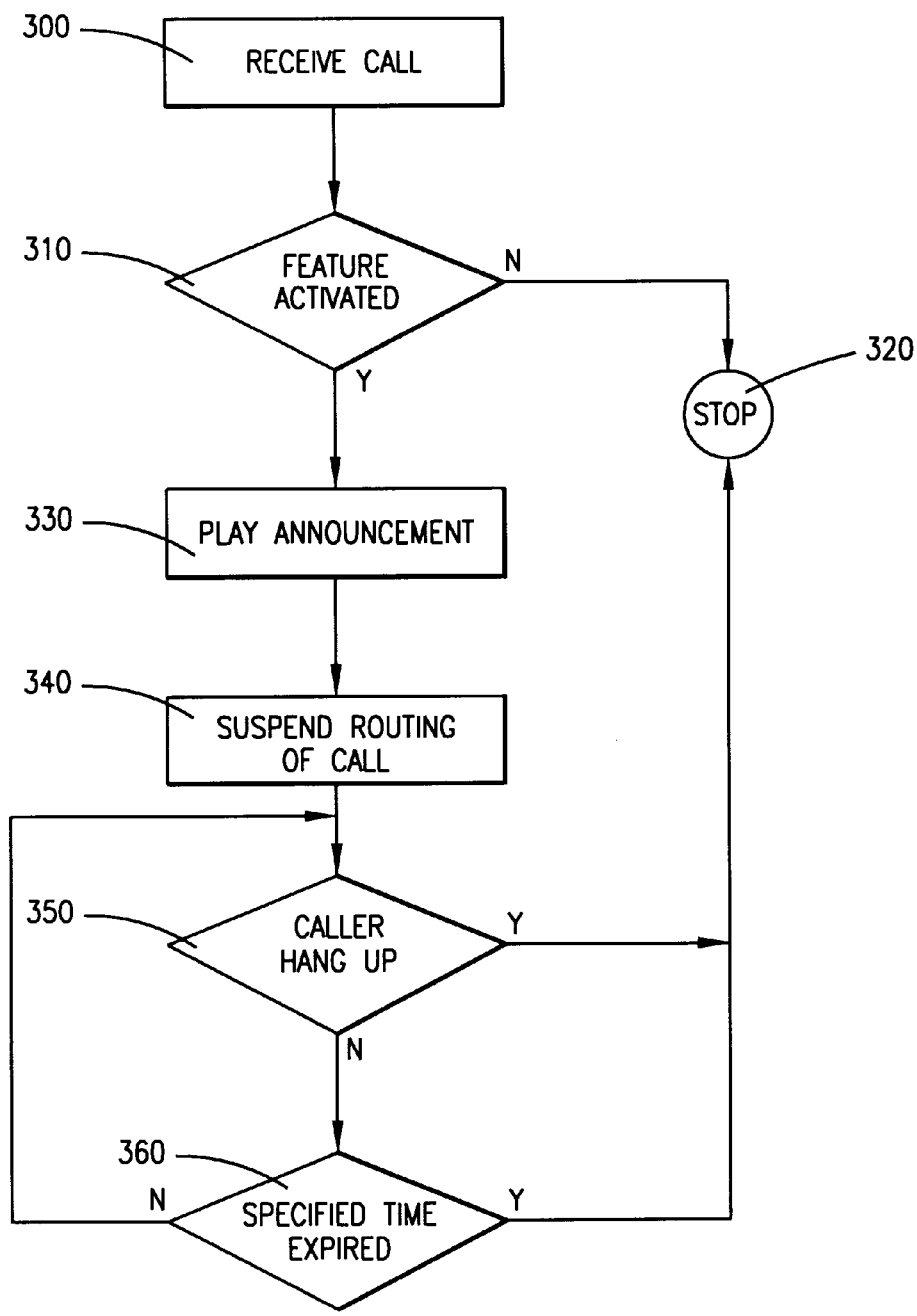
FIG. 3 is a flow chart that illustrates a method for playing an announcement to a calling party in accordance with a preferred embodiment of the present invention.

FIG. 3 is a flow chart which illustrates a method for playing an announcement to a calling party, in accordance with a preferred embodiment of the invention. After a call is received (step 300), processing unit 42 of FIGS. 1 and 2 determines whether the SACSF is presently activated (step 310). If not, the method of the present invention is terminated (step 320). If the SACSF is activated, an announcement is generated to the calling party (step 330), and the routing of the call is suspended for a specified amount of time (step 340). The call routing remains suspended until it is determined that the caller has hung up (step 350) or that the specified amount of time has expired (step 360). A typical specified amount of time is preferably three (3) seconds after the announcement was played (step 330).

Although an embodiment of the method and apparatus of the present invention has been illustrated in the accompanying Drawings and described in the foregoing Detailed Description, it is understood that the invention is not limited to the embodiments disclosed, but can be arranged in numerous ways and that modifications and substitutions may be made without departing from the spirit of the invention as set forth and defined by the following claims.

What is claimed is:

1. A communication system for connecting a calling party to a called party through a communication switch at a corresponding specified time, said communication system comprising:
   determining means for determining, upon receipt of said call at said communication switch, whether said called party is a subscriber to a time-specific Send Announcement to Caller Subscriber Feature (SACSF), whether said SACSF is activated, and whether said call was received during said corresponding specific time;
   voice generator means for generating a standard announcement to said calling party at said corresponding specified time before terminating the call;
   a processing unit for transmitting control signals;
   a message store for generating a customized message to the calling party at said corresponding specified time before terminating the call; and
   a router coupled to receive the control signals and connected to said voice generator means, to the message store, to a calling party phone line associated with said calling party, and to a called party phone line associated with said called party, the router connecting one of the message store or the voice generator means to said calling party according to said corresponding specified time and to the control signals received from said processing unit and connecting said calling party to said called party wherein the number of unnecessary calls are limited during a specified time period.

2. The communication system according to claim 1, wherein the message store is operable to record a customized message therein, said customized message being a recording of the called party.

3. The communication system according to claim 1, wherein the standard announcement played by the voice generator is preselected by the called party from a plurality of announcements.

4. The communication system according to claim 3, wherein the standard announcement played by the voice generator informs the calling party that the call is subject to monitoring.

5. The communication system according to claim 1, wherein said standard and said customized announcements are a called party selectable feature, further wherein said processing unit determines whether the called party has selectably activated the selectable feature prior to the transmission of said control signals.

6. The system according to claim 1, wherein said message store comprises a list of a plurality of SACSF subscribers, at least one of said SACSF subscribers having said customized message play to said calling party.

7. The system according to claim 6, wherein said list for each of said plurality of subscribers includes a respective indicator specifying whether said SACSF is activated for said respective subscriber.

8. The system according to claim 1, wherein said message store comprises a list of a plurality of SACSF subscribers and a respective customized message corresponding thereto.

9. The system according to claim 1, wherein said message store comprises a list containing at least one time period during which said SACSF is activated, said at least one time period including said corresponding specific time.

10. The system according to claim 1, wherein said SACSF announcement contains a message selected from the group consisting of a slogan and an advertisement.

11. A method for routing a call from a calling party to a called party through a local switch of a telecommunications system at a corresponding specified time, said method comprising the steps of:
    determining, upon receipt of said call at said local switch, whether said called party is a subscriber to a time-specific Send Announcement to Caller Subscriber Feature (SACSF);
    determining, at said local switch, whether said SACSF is activated and whether said call was received during said corresponding specific time;
    suspending said call routing within said switch at the commencement of said corresponding specific time;
    generating, upon said call routing suspension, an SACSF announcement to said calling party before terminating the call, said call routing being suspended for a specified time period after the termination of said SACSF announcement, the duration of said SACSF announcement being less than the duration of said corresponding specified time; and routing, after the termination of said specified time period, said call from said calling party to said called party through said local switch wherein the number of unnecessary calls are limited during a specified time period.

12. The method according to claim 11, wherein said specified time period is less than about 30 seconds.

13. The method according to claim 11, wherein said announcement in said step of generating comprising a standard announcement.

14. The method according to claim 11, wherein said announcement in said step of generating comprises a customized announcement.

15. The method according to claim 11, wherein said announcement in said step of generating is one of a standard and a customized announcements, said announcement being a called party selection.

16. The method according to claim 11, wherein said announcement in said step of generating is stored in a message store.

17. The method according to claim 16, wherein said message store comprises a list of a plurality of SASCF subscribers, at least one of said SASCF subscribers having said announcement play to said calling party.

18. The method according to claim 17, wherein said list for each of said plurality of subscribers includes a respective indicator specifying whether said SACSF is activated for said respective subscriber.

19. The method according to claim 16, wherein said message store comprises a list of a plurality of SACSF subscribers and a respective customized message corresponding thereto.

20. The method according to claim 11, wherein said message store comprises a list containing at least one time period during which said SACSF is activated, said at least one time period including said corresponding specified time.

21. The method according to claim 11, wherein said SACSF announcement contains a message selected from the group consisting of a slogan and an advertisement.

22. A communication switch for routing a call from a calling party to a called party at a corresponding specified time, said communication switch comprising:

determining means for determining, upon receipt of said call at said communication switch, whether said called party is a subscriber to a time-specific Send Announcement to Caller Subscriber Feature (SACSF), whether said SACSF is activated, and whether said call was received during said corresponding specific time;

call routing suspension means for suspending said call routing within said communication switch at said corresponding specified time;

voice means for generating an SACSF announcement, upon activation of said call routing suspension means, to said calling party before terminating the call, said call routing being suspended by said call routing suspension means for a specified time period after the termination of said SACSF announcement; and connection means for connecting, after the termination of said specified time period, said call from said calling party to wherein the number of unnecessary calls are limited during a specified time period said called party through said communication switch.

23. The communication switch according to claim 22, wherein said voice means comprises a voice generator and said announcement is a standard announcement generated by said voice generator.

24. The communication switch according to claim 23, wherein said voice means further comprises a message store, said voice generator generating said standard announcement if said message store contains no customized announcement therein.

25. The communication switch according to claim 22, wherein said voice means comprises a message store and said announcement is a customized announcement stored in said message store.

26. The communication switch according to claim 22, wherein said announcement is one of a standard and a customized announcement, said announcement being a called party selection.

27. The communication switch according to claim 22, wherein said message store comprises a list of a plurality of SACSF subscribers, at least one of said SACSF subscribers having said customized message play to said calling party.

28. The communication switch according to claim 27, wherein said list for each of said plurality of subscribers includes a respective indicator specifying whether said SACSF is activated for said respective subscriber.

29. The communication switch according to claim 22, wherein said message store comprises a list of a plurality of SACSF subscribers and a respective customized message corresponding thereto.

30. The communication switch according to claim 22, wherein said message store comprises a list containing at least one time period during which said SACSF is activated, said at least one time period including said corresponding specified time.

31. The Communication switch according to claim 22, wherein said SACSF announcement contains a message selected from the group consisting of a slogan and an advertisement.

* * * * *